(12) United States Patent
Poppe et al.

(10) Patent No.: US 7,169,832 B2
(45) Date of Patent: Jan. 30, 2007

(54) NANOPARTICLES, METHOD FOR MODIFYING THEIR SURFACES, DISPERSION OF NANOPARTICLES, METHOD FOR THE PRODUCTION AND THE UTILIZATION THEREOF

(75) Inventors: Andreas Poppe, Albersloh (DE); Elke Westhoff, Steinfurt (DE); Winfried Stübbe, Greven (DE); Beate Gebauer, Münster (DE); Peter Mayenfels, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/525,268

(22) PCT Filed: Oct. 2, 2003

(86) PCT No.: PCT/EP03/10922

§ 371 (c)(1),
(2), (4) Date: Aug. 23, 2005

(87) PCT Pub. No.: WO2004/035649

PCT Pub. Date: Apr. 29, 2004

(65) Prior Publication Data

US 2006/0041035 A1    Feb. 23, 2006

(30) Foreign Application Priority Data

Oct. 10, 2002    (DE)    ................................ 102 47 359

(51) Int. Cl.
*C08K 9/00*    (2006.01)
(52) U.S. Cl. .................... 523/200; 252/315.2; 428/403; 428/402; 428/407
(58) Field of Classification Search ................ 523/200; 252/315.2; 428/402, 403, 407
See application file for complete search history.

(56) References Cited

U.S. PATENT DOCUMENTS 6,444,143 B1 *  9/2002  Bawendi et al. ...... 252/301.6 S
6,649,138 B1 * 11/2003  Adams et al. ............. 423/403

FOREIGN PATENT DOCUMENTS

| EP | 0 872 500 | | 4/1998 |
| EP | 872500 A1 | * | 10/1998 |
| WO | WO97/38058 | | 10/1997 |
| WO | WO-97/038058 | * | 10/1997 |
| WO | WO-97/38058 A | * | 10/1997 |
| WO | WO02/062881 | | 8/2002 |
| WO | WO-02/062881 A3 | * | 8/2002 |
| WO | WO-2004/035649 A1 | * | 4/2004 |

OTHER PUBLICATIONS

NIMB Beam Interactions with Materials & Atoms, "Surface modification of nanopartocles for radiation curable acrylate clear coating", F. Bauer, et al., 2003, p. 267-270.

* cited by examiner

*Primary Examiner*—David W. Wu
*Assistant Examiner*—Henry S. Hu

(57) ABSTRACT

Surface-modified nanoparticles whose surface is covered completely or near-completely with (A) modifying groups which
    are attached covalently to the surface via linking functional groups (a) and
    contain inert spacer groups (b) and
    contain reactive functional groups (c) which are connected via the groups (b) to the groups (a) and are inert toward the reactive functional groups of the surface to be modified, (B) modifying groups which
    are attached covalently to the surface via linking functional groups (a) and
    contain inert groups (d) having a smaller hydrodynamic volume $V_H$ than the inert spacer groups (Ab), and (C) modifying groups which
    are attached to the surface via linking functional groups (a) which contain at least one silicon atom,
    contain inert groups (e), and
    have a smaller hydrodynamic volume $V_H$ than the modifying groups (A);

dispersions comprising the nanoparticles, processes for preparing them, and their use.

27 Claims, No Drawings

NANOPARTICLES, METHOD FOR MODIFYING THEIR SURFACES, DISPERSION OF NANOPARTICLES, METHOD FOR THE PRODUCTION AND THE UTILIZATION THEREOF

FIELD OF THE INVENTION

The present invention relates to novel surface-modified nanoparticles. The present invention further relates to novel dispersions of the surface-modified nanoparticles in aprotic solvents, especially apolar aprotic solvents. The present invention additionally relates to a novel process for preparing surface-modified nanoparticles and their dispersions in aprotic solvents, especially apolar aprotic solvents. The present invention relates not least to the use of the novel surface-modified nanoparticles and their novel dispersions in aprotic solvents, especially apolar aprotic solvents, for preparing coating materials, adhesives, sealants, compounds based on engineering plastics, and curable compositions for producing coatings, paint systems, adhesive films, seals, moldings, especially optical moldings, self-supporting films, and rigid foams.

PRIOR ART

Nanoparticles whose surfaces have been modified with primary alcohols such as n-hexanol are known from the American patent U.S. Pat. No. 4,652,470 A. This modification gives the nanoparticles hydrophobic properties, so that they can be dispersed in organic solvents such as are commonly used in thermally curable coating materials. In the course of the curing of the coating materials, however, the known surface-modified nanoparticles are not incorporated into the resulting three-dimensional networks of the coatings.

Nanoparticles whose surface has been modified with silanes containing blocked isocyanate groups and with hydrolyzable silanes are known from the American patent U.S. Pat. No. 5,998,504 A or European patent application EP 0 872 500 A1. The surface-modified nanoparticles can be dispersed in polar aprotic solvents such as methoxypropyl acetate.

However, it is necessary for considerable quantities of secondary alcohols, isopropanol in particular, to be present in order to suppress agglomeration of the nanoparticles and to stabilize the dispersion.

Also from the DE 100 64 637 A1 and the DE 199 15 502 A1 inorganic nanoparticles for use in dental care preparations or for the production of polynucleotide complexes for the transfection of cells are known, which inorganic nanoparticles are modified at their surface with silanes or phosphorus compounds. Because of the said predetermined use the disclosed particles are stabilized in polar media having a high dielectricity constant. It can therefore be assumed that the particles are stabilized to certain extent via electrostatic interactions. This is underlined by the zeta potentials which are disclosed in the DE 199 15 502 A1. As this kind of stabilization is practically not possible in aromatic, unpolar solvents, as for example, solventnaphtha or other solvents for coating compositions because of their significantly lower dielectricity constant, the nanoparticles described in the said applications are not suitable for being used in conventional coating compositions.

European patent application EP 0 832 947 A2 discloses nanoparticles whose surfaces have been modified with silanes containing carbamate groups. The silanes containing carbamate groups are prepared by reacting silanes containing one isocyanate group with hydroxypropyl carbamate. The surface-modified nanoparticles are dispersed in water-containing polar aprotic solvents.

Although the known coatings exhibit improvements in scratch resistance as compared with their nanoparticle-free counterparts, their chemical resistance and acid resistance still leave something to be desired. The known dispersions of surface-modified nanoparticles, moreover, are not suitable for producing two-component coating materials based on polyisocyanates, since they react very rapidly with the polyisocyanates and form gels, leading to clouding and bitiness in the coatings produced from them. The reason for this lies in the continuingly high reactivity of the surface-modified nanoparticles and/or the reactivity of the secondary alcohols (which are needed to stabilize the dispersions) toward polyisocyanates.

PROBLEM OF THE INVENTION

It is an object of the present invention to provide novel surface-modified nanoparticles which can be dispersed readily in aprotic, especially apolar aprotic, organic solvents and/or olefinically unsaturated monomers (reactive diluents). The novel dispersions of the surface-modified nanoparticles are to be stable on storage even at solids contents of more than 50% by weight, and not to prone to sedimenting.

Not only the novel surface-modified nanoparticles but also their novel dispersions in aprotic solvents, especially apolar solvents, and/or olefinically unsaturated monomers (reactive diluents) are not to undergo any unwanted reactions, such as premature formation of gels, with polyisocyanates. At the same time, however, they ought to have a sufficiently high reactivity to undergo thermally, free-radically, catonically and/or photochemically initiated crosslinking reactions or polymerization reactions with reactive functional groups other than isocyanate groups.

The novel surface-modified nanoparticles and their dispersions ought to be easy to prepare without any need for complicated processes.

The novel surface-modified nanoparticles and the dispersions in aprotic solvents, especially apolar aprotic solvents, and/or olefinically unsaturated monomers (reactive diluents) ought also to be outstandingly suitable for preparing thermally curable and/or actinic radiation-curable compositions, coating materials, especially two-component coating materials based on polyisocyanates, adhesives, and sealants, and also compounds based on engineering plastics.

The compositions, coating materials, adhesives, and sealants curable thermally and/or with actinic radiation ought to be easy to prepare and stable on storage. In particular, they should not form any unwanted gels. The compounds based on engineering plastics ought likewise to be preparable simply in accordance with conventional methods of plastics processing. The coating materials, adhesives, and sealants ought to be outstandingly suitable for producing coatings, paint systems, adhesive films, and seals. The curable compositions and the compounds based on engineering plastics ought equally to be outstandingly suitable for producing moldings, especially optical moldings, self-supporting films, and rigid foams.

The novel coatings, paint systems, adhesive films, seals, moldings, self-supporting films, and rigid foams ought not only to be scratch-resistance but also chemically stable and acid-stable. Moreover, the novel coatings, paint systems, adhesive films, seals, optical moldings, and self-supporting films ought to be completely transparent and clear without any clouding or bittiness. Their surface, moreover, should be smooth and free from defects.

In addition it was an object of the present invention to provide a novel process for producing surface-modified nanoparticles which can be conducted simply and varied particularly broadly in terms of the materials it employs, so that novel surface-modified nanoparticles can be tailor made for a particularly wide number of applications. Not least, the novel process ought to provide surface-modified nanoparticles which can be readily dispersed in aprotic solvents, especially apolar aprotic solvents, such as are used, for example, for preparing two-component coating materials, and/or in olefinically unsaturated monomers (reactive diluents).

THE SOLUTION AFFORDED BY THE INVENTION

The invention accordingly provides the novel surface-modified nanoparticles whose surface is covered completely or near-completely with
(A) modifying groups which
  are attached covalently to the surface via linking functional groups (a) and
  contain inert spacer groups (b) and
  contain reactive functional groups (c) which are connected via the groups (b) to the groups (a) and are inert toward the reactive functional groups of the surface to be modified,
(B) modifying groups which
  are attached covalently to the surface via linking functional groups (a) and
  contain inert groups (d) having a smaller hydrodynamic volume $V_H$ than the inert spacer groups (Ab), and
(C) modifying groups which
  are attached to the surface via linking functional groups (a) which contain at least one silicon atom,
  contain inert groups (e), and
  have a smaller hydrodynamic volume $V_H$ than the modifying groups (A)

and which are referred to below as "nanoparticles of the invention".

The invention further provides the novel dispersions of surface-modified nanoparticles which are preparable by dispersing nanoparticles of the invention in aprotic solvents and/or reactive diluents and which are referred to below as "dispersions of the invention".

Further subject matter of the invention will emerge from the description.

THE ADVANTAGES OF THE SOLUTION AFFORDED BY THE INVENTION

In the light of the prior art it was surprising and unforeseeable for the skilled worker that the object on which the present invention was based could be achieved by means of the nanoparticles, dispersions, and preparation process of the invention.

In particular it was surprising that the nanoparticles of the invention could be dispersed readily in aprotic, especially apolar aprotic, organic solvents and/or olefinically unsaturated monomers (reactive diluents). The nanoparticle dispersions of the invention were stable on storage surprisingly even at solids contents of more than 50% by weight and were not prone to sedimenting.

Both the nanoparticles of the invention and their dispersions of the invention in aprotic, especially apolar aprotic, solvents and/or olefinically unsaturated monomers (reactive diluents) did not enter into any unwanted reactions, such as premature gelling, with polyisocyanates. At the same time, however, they were sufficiently reactive to enter into thermally, free-radically, catonically and/or photochemically initiated crosslinking or polymerization reactions with reactive functional groups other than isocyanate groups.

The nanoparticles of the invention and the dispersions of the invention were easy to prepare, without the need for complicated processes.

The nanoparticles of the invention and the dispersions of the invention were, moreover, outstandingly suitable for preparing thermally curable and/or actinic-radiation-curable compositions, coating materials, especially two-component coating materials based on polyisocyanates, adhesives, and sealants, and also compounds based on engineering plastics. The compositions, coating materials, adhesives, and sealants of the invention, curable thermally and/or with actinic radiation, were easy to prepare and stable on storage. In particular, they did not form any unwanted gels. The compounds of the invention based on engineering plastics were likewise preparable in a simple way in accordance with conventional methods of plastics processing. The coating materials, adhesives, and sealants of the invention were outstandingly suitable for producing coatings, paint systems, adhesive films, and seals. The curable compositions and compounds based on engineering plastics, according to the invention, were also outstandingly suitable for producing moldings, especially optical moldings, self-supporting films, and rigid foams.

The coatings, paint systems, adhesive films, seals, moldings, self-supporting films, and rigid foams of the invention were not only scratch-resistant but also chemically stable and acid-stable. Moreover, the coatings, paint systems, adhesive films, seals, optical moldings, and self-supporting films were completely transparent and clear, where necessary, and did not exhibit any clouding or bittiness. Their surface, in addition, was smooth and free from defects.

The process of the invention for preparing the nanoparticles and dispersions of the invention was easy to carry out and could be varied with particular breadth in terms of the materials it used, thereby allowing nanoparticles of the invention to be tailor made for a particularly large number of applications. Not least, the preparation process of the invention gave surface-modified nanoparticles which were readily dispersible in aprotic, especially apolar aprotic, solvents, such as those used, for example, for preparing two-component and multicomponent coating materials, and/or in olefinically unsaturated monomers (reactive diluents).

DETAILED DESCRIPTION

For the nanoparticles of the invention it is essential that their surface is covered completely or near-completely with modifying groups. "Covered completely or near-completely" means that the surface of the nanoparticles of the invention is covered to the extent allowed by the steric requirements of the individual modifying groups and that any reactive functional groups that may still be present on the surface of the nanoparticles of the invention are sterically shielded and so prevented from reactions with, say, polyisocyanates.

The surface of the nanoparticles of the invention are covered with at least three, in particular three, different classes of modifying groups.

In accordance with the invention the first class comprises modifying groups (A) which are attached covalently to the surface via at least one, preferably at least two, and in particular three, linking functional group(s) (Aa). Under the conditions under which the nanoparticles of the invention are employed, the groups (Aa) are preferably inert. The linking functional groups (Aa) contain preferably at least one, in particular one, silicon atom. With particular preference, the linking functional groups (Aa) are siloxane groups.

The groups (A) contain at least one, especially one, inert spacer group (b).

"Inert" with respect to the group (Ab) means, here and below, that it does not enter into any reactions under the conditions under which the nanoparticles of the invention are prepared and employed (cf. also Roempp Online, Georg Thieme Verlag, Stuttgart, N.Y., 2002, "Inert").

The inert spacer group (Ab) preferably comprises at least one divalent, especially divalent, organic radical R which is selected preferably from the group consisting of aliphatic, cycloaliphatic, aromatic, aliphatic-cycloaliphatic, aliphatic-aromatic, cycloaliphatic-aromatic, and aliphatic-cycloaliphatic-aromatic radicals. The radicals R may contain more than one of the stated structural units.

The radicals R may further contain at least one at least divalent, especially divalent, functional group and/or at least one substituent. It is essential that the divalent functional groups and the substituents are inert in the sense specified above. Examples of suitable divalent functional groups are the linking functional groups (Ba) described below. Examples of suitable substituents are halogen atoms, especially fluorine atoms and chlorine atoms, nitrile groups, nitro groups or alkoxy groups. Preferably, the radicals R are unsubstituted.

The modifying group (A) further includes at least one, especially one, reactive functional group (Ac) which is connected via the group (Ab) to the group (a) and which is inert, under the conditions under which the nanoparticles of the invention are prepared, toward the reactive functional groups of the surface to be modified (cf. also Roempp Online, Georg Thieme Verlag, Stuttgart, N.Y., 2002, "inert"). Nevertheless, under the conditions under which the nanoparticles of the invention are employed, the reactive functional group (Ac) is not inert but is instead reactive. In particular, it can be activated thermally and/or with actinic radiation, so that it is able to enter into reactions initiated thermally and/or with actinic radiation., such as condensation reactions or addition reactions, which may proceed in accordance with free-radical, cationic or anionic mechanisms.

Here and below, actinic radiation means electromagnetic radiation, such as near infrared (NIR), visible light, UV radiation, x-rays or gamma radiation, especially UV radiation, and corpuscular radiation, such as electron beams or neutron beams, especially electron beams.

Examples of suitable thermally activable, reactive functional groups (Ac) are epoxide groups and blocked isocyanate groups, especially blocked isocyanate groups of the general formula I:

—NH—C(X)—R$^1$ (I)

in which the variable X stands for an oxygen atom or a sulfur atom, in particular an oxygen atom, and the variable R$^1$ stands for the radical of a blocking agent such as is customarily used to block isocyanate groups.

Examples of suitable blocking agents are
i) phenols such as phenol, cresol, xylenol, nitrophenol, chlorophenol, ethylphenol, t-butylphenol, hydroxybenzoic acid, esters of this acid or 2,5-di-tert-butyl-4-hydroxytoluene;
ii) lactames, such as ε-caprolactam, δ-valerolactam, γ-butylrolactam or β-propiolactam;
iii) active methylenic compounds, such as diethyl malonate, dimethyl malonate, methyl or ethyl acetate or acetylacetone;
iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxy methanol, glycol acid, glycolic esters, lactic acid, lactic esters, methylol urea, methylol melamine, diacetone alcohol, ethylene chlorohydrine, ethylene bromohydrin, 1,3-dichloro-2-propanol, 1,4-cyclohexyldimethanol or aceto-cyanohydrin;
v) mercaptans such as butyl mercaptan, hexyl mercaptan, t-butyl mercaptan, t-dodceyl mercaptan, 2-mercaptobenzothiazole thiophenol, methylthiophenol or ethyl-thiophenol;
vi) acid amides such as acetoanilide, acetoanisidinamide, acrylamide, methacrylamide, acidamide, stearamide or benzamide;
vii) imides such as succinimide, phthalimide or maleimide;
viii) amines such as diphenylamine, phenylnaphthylamine, xylidine, N-phenylxylidine, carbazole, aniline, naphthylamine, butylamine, dibutylamine or butylphenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenyl carbamate or 2-oxazolidone;
xii) imines such as ethyleneimine;
xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, especially dimethylpyrazoles, imidazoles or triazoles; and also
xvii) mixtures of these blocking agents, especially dimethylpyrazole and succinimide.

Examples of suitable reactive functional groups (Ac) which can be activated with actinic radiation are groups which contain at least one, especially one, bond which can be activated with actinic radiation. Examples of suitable bonds activable with actinic radiation are carbon-hydrogen single bonds or carbon-carbon, carbon-oxygen, carbon-nitrogen, carbon-phosphorus or carbon-silicon single or double bonds and carbon-carbon triple bonds. Of these, the double bonds, especially the carbon-carbon double bonds ("double bonds" below), are employed with preference.

Highly suitable double bonds are present, for example, in (meth)acrylate, ethacrylate, crotonate, cinnamate, vinyl ether, vinyl ester, ethenylarylene, dicyclopentadienyl, norbornenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclo-pentadienyl ester, norbornenyl ester, isoprenyl ester, isopropenyl ester, allyl ester or butenyl ester groups. Of these, (meth) acrylate groups, especially acrylate groups, are of particular advantage and are therefore used with very particular preference.

In accordance with the invention the second class comprises modifying groups (B) which are attached covalently via at least one linking functional group (Ba) to the surface of the nanoparticles that are to be modified. It is preferred to use groups (Ba) which are inert under the conditions under which the nanoparticles of the invention are employed. The groups (Ba) are preferably selected from the group consisting of ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, hydrazide, urethane, urea, thiourea, carbonyl, thiocarbonyl, sulfone, and sulfoxide groups. Particular preference is given to ether groups.

The modifying groups (B) additionally include at least one, especially one, inert group (Bd) which is linked via the group (Ba) to the surface. Like the group (Ab), the group (Bd) is inert under the conditions under which the nanoparticles of the invention are prepared and used. The groups (Bb) are preferably monovalent organic radicals $R^2$. They are preferably selected from the group consisting of aliphatic, cycloaliphatic, aromatic, aliphatic-cycloaliphatic, aliphatic-aromatic, cycloaliphatic-aromatic, and aliphatic-cycloaliphatic-aromatic radicals. They may contain the above-described functional groups and/or substituents with a valency of at least two.

It is important that the inert groups (Bd) have a smaller hydrodynamic volume $V_H$ than the inert spacer groups (Ab). The hydrodynamic volume $V_H$ can be determined by means of photon correlation spectroscopy or estimated using the equation $$V_H = (r_{cont}/2)^3,$$

in which $r_{cont}$ is the effective contour length of a molecule. For further details, refer to the textbook by H.-G. Elias, "Makromoleküle", Hüthig & Wepf Verlag, Basle, Vol. 1, "Grundlagen". [Principles], page 51.

In accordance with the invention, the third class comprises modifying groups (C) which are attached covalently via at least one, especially one, linking functional group (Ca) to the surface of the nanoparticles of the invention. The groups (Ca) are preferably inert under the conditions under which the nanoparticles of the invention are employed. The linking functional groups (Ca) preferably contain at least one, especially one, silicon atom. With particular preference, the linking functional groups. (Ca) are siloxane groups.

The modifying groups (C) further include at least one, preferably at least two, and in particular at least three, inert group(s) (Ce) linked via the group (Ca) to the surface. Like the group (Bd) or (Aa), the group (Ce) is inert under the conditions under which the nanoparticles of the invention-are prepared and used. The groups (Ce) are preferably monovalent organic radicals $R^2$. They are preferably selected from the group consisting of aliphatic, cycloaliphatic, aromatic, aliphatic-cycloaliphatic, aliphatic-aromatic, cycloaliphatic-aromatic, and aliphatic-cycloaliphatic-aromatic radicals. They may contain the above-described functional groups and/or substituents with a valency of at least two.

It is important that the groups (C) have a smaller hydrodynamic volume $V_H$ than the modifying groups (A).

The weight ratio of the modifying groups (A):(B):(C) may vary widely and is guided by the requirements of the case in hand. The weight ratio (A):(B):(C) is preferably (4 to 200):(0.1 to 60):1,
more preferably (7 to 100):(0.2 to 15):1, and
in particular (10 to 50):(0.5 to 10):1.

The nanoparticles of the invention can be prepared by the conventional methods of organic and organosilicon chemistry by, for example, jointly hydrolyzing and condensing suitable silanes having hydrolyzable groups or reacting nanoparticles for modification with suitable organic compounds and silanes having hydrolyzable groups.

The nanoparticles of the invention are preferably prepared by reacting the reactive functional groups of the surface of nanoparticles for modification with the modifiers described below. Examples of suitable reactive functional groups are acid groups, such as carboxyl groups, sulfonic acid groups or phosphoric acid groups, and hydroxyl groups, especially hydroxyl groups.

In accordance with the invention the nanoparticles for modification are reactive with at least one modifier (A).

The modifier (A) contains at least one, preferably at least two, and in particular at least three reactive functional groups (Aa) which are reactive toward the reactive functional groups of the surface to be modified. The reactive functional group (Aa) preferably contains at least one, especially one, silicon atom. Reactive functional groups (Aa) are conventional and can be selected by the skilled worker on the basis of the complementary reactive functional groups on the surface to be modified.

The modifier (A) further includes at least one, preferably one, of the above-described inert spacer groups (Ab). These are covalently linked with the reactive functional groups (Aa).

In addition, the modifier includes at least one, especially one, of the above-described reactive functional groups (Ac) which are connected via the group (Ab) to the group (Aa) and which are inert toward the reactive functional groups of the surface to be modified.

In accordance with the invention, moreover, the nanoparticles for modification are reacted with at least one modifier (B).

The modifier (B) includes at least one, especially one, reactive functional group (Ba) which is reactive toward the reactive functional groups of the surface to be modified. The reactive functional groups (Ba) may per se comprise the above-described reactive functional groups (Aa). Preferably, however, the reactive functional groups (Ba) are selected from the group consisting of the precursors of the linking functional groups (Ba), preferably from ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, hydrazide, urethane, urea, thiourea, carbonyl, thiocarbonyl, sulfone, and sulfoxide groups (Ba), in particular from ether groups (Ba). The reactive functional groups (Ba) are conventional reactive functional groups of organic chemistry and may therefore readily be selected by the skilled worker on the basis of his or her art knowledge.

The modifier (B) further includes at least one, especially one, of the above-described inert groups (Bd) having a smaller hydrodynamic volume $V_H$ than the above-described inert spacer group (Ab). The group (Bd) is preferably linked directly with the reactive functional group (Ba).

In accordance with the invention, the nanoparticles for modification are further reacted with at least one modifier (C) having a smaller hydrodynamic volume $V_H$ than the modifier (A).

The modifier (C) contains at least one reactive functional group (Ca) which contains at least one, especially one, silicon atom and is reactive toward the reactive functional groups of the surface to be modified.

The modifier (C) further includes at least one, preferably at least two, and in particular three of the above-described inert groups (Ce) which are preferably linked directly with the reactive functional group (Ca).

The modifiers (A) are preferably selected from the group consisting of silanes of the general formula II:

$$[(R^2)_o(R^3)_{3-o}Si]_m R(Ac)_n \quad (II)$$

in which the indices and variables have the following definitions:
- m and n are integers from 1 to 6, preferably from 1 to 5, and in particular from 1 to 3;
- o is 0, 1 or 2, especially 0;
- Ac is a group activable thermally and/or with actinic radiation, as defined above;
- R is an at least divalent organic radical, as defined above;
- $R^2$ is a monovalent organic radical, as defined above; and
- $R^3$ is a hydrolyzable atom or group.

The hydrolyzable atom $R^3$ is preferably selected from the group consisting of hydrogen atoms, fluorine atoms, chlorine atoms, and bromine atoms, and the hydrolyzable group $R^3$ is preferably selected from the group consisting of hydroxyl groups and monovalent organic radicals $R^4$.

The monovalent organic radical $R^4$ is preferably selected from the group consisting of groups of the general formula III:

$$-Y-R^2 \quad (III)$$

in which the variable Y stands for an oxygen atom or a carbonyl group, carbonyloxy group, oxycarbonyl group, amino group —NH— or secondary amino group —$NR^2$—, in particular an oxygen atom, and the variable $R^2$ is as defined above.

The hydrolyzable monovalent organic radical $R^4$ is preferably selected from the group consisting of unsubstituted alkoxy radicals having from 1 to 4 carbon atoms in the alkyl radical.

The silanes (A) are compounds known per se and can be prepared by the conventional methods of organosilicon chemistry. The silanes (A) are preferably obtainable by (1) reacting polyisocyanates with blocking agents, such as those described above, and with silanes of the general formula IV:

$$[(R^2)_o(R^3)_{3-o}Si]_m RZ \quad (IV)$$

in which the variable Z stands for an isocyanate-reactive functional group, preferably a hydroxyl group, a thiol group or a primary or secondary amino group, in particular a hydroxyl group, and the variables R, $R^2$ and $R^3$ are as defined above; or (2) reacting compounds of the general formula V:

$$(Ac)_n R-Z \quad (V)$$

in which the index n and the variables Ac, R, and Z are as defined above with silanes of the general formula VI:

$$[(R^2)_o(R^3)_{3-o}Si]_m R-NCO \quad (VI)$$

in which the index m and the variables R, $R^2$ and $R^3$ are as defined above.

Examples of suitable silanes of the general formula IV are known, for example, from the American patent U.S. Pat. No. 5,998,504 A1, column 3, line 37 to column 4, line 29 or from European patent application EP 1 193 278 A1, page 3, lines 27 to 43.

Examples of suitable polyisocyanates are:

diisocyanates such as isophorone diisocyanate (i.e., 5-isocyanato-1-isocyanatomethyl-1,3,3-trimethyl-cyclohexane), 5-isocyanato-1-(2-isocyanatoeth-1-yl)-1,3,3-trimethyl-cyclohexane, 5-isocyanato-1-(3-isocyanatoprop-1-yl)-1,3,3-trimethyl-cyclohexane, 5-isocyanato-(4-isocyanatobut-1-yl)-1,3,3-trimethyl-cyclohexane, 1-isocyanato-2-(3-isocyanatoprop-1-yl) cyclohexane, 1-isocyanato-2-(3-isocyanatoeth-1-yl)cyclohexane, 1-isocyanato-2-(4-isocyanatobut-1-yl) cyclohexane, 1,2-diisocyanatocyclobutane, 1-3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or di-isocyanates derived from dimeric fatty acids, as sold under the commerical designation DDI 1410 by Henkel and described in patents WO 97/49745 and WO 97/49747, especially 2-heptyl-3,4-bis(9-isocyanatononyl)-1-pentylcyclohexane or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-l-yl)cyclohexane, 1,2-, 1,4- or 1,3-bis(4-isocyanatobut-1-yl)cyclohexane or liquid bis(4-isocyanatocyclohexyl)methane with a trans/trans content of up to 30% by weight, preferably 25% by weight, and in particular 20% by weight, as described in patent applications DE 44 14 032 A1, GB 1 220 717 A1, DE 16 18 795 A1 or DE 17 93 785 A1, preferably isophorone diisocyanate, 5-isocyanato-1-(2-isocyanatoeth-1-yl)-1,3,3-trimethyl-cyclohexane, 5-isocyanato-1-(3-isocyanatoprop-1-yl)-1,3,3-trimethyl-cyclohexane, 5-isocyanato-(4-isocyanatobut-1-yl)-1,3,3-trimethyl-cyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane or HDI, especially HDI; or polyisocyanates which contain isocyanurate, biuret, allophanate, iminooxadiazinedione, urethane, urea, carbodiimide and/or uretdione groups and are prepared conventionally from the diisocyanates described above; examples of suitable preparation processes and polyisocyanates are known, for example, from patents CA 2,163,591 A, U.S. Pat. Nos. 4,419,513 A, 4,454,317 A, EP 0 646 608 A, U.S. Pat. Nos. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. Nos. 5,258,482 A, 5,290,902 A, EP 0 649 806 A1, DE 42 29 183 A1 or EP 0 531 820 A1.

Further examples of suitable polyisocyanates are known from the American patent U.S. Pat. No. 5,998,504 A, column 5, line 21, to column 6, line 2.

Particular preference is given to using isocyanurates based on isophorone diisocyanate to prepare the silanes (A).

Examples of suitable compounds of the general formula V are glycidol and conventional, hydroxyl-containing, olefinically unsaturated monomers, such as hydroxyalkyl esters of alpha,beta-olefinically unsaturated carboxylic acids, such as hydroxyalkyl esters of acrylic, methacrylic, and ethacrylic acid in which the hydroxylalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl)cyclohexane, octahydro-4,7-methano-1H-indenedimethanol or methylpropanediol monoacrylate, monoethacrylate, monomethacrylate or monocrotonate; or reaction products of cyclic esters, such as epsilon-caprolactone, for example, and these hydroxyalkyl esters;

olefinically unsaturated alcohols such as allyl alcohol;

allyl ethers of polyols, such as trimethylolpropane monoallyl ether or pentaerythritol mono- di- or triallyl ether. The higher polyfunctional monomers are generally used only in minor amounts. For the purposes of the present invention, minor amounts of higher polyfunctional monomers here are understood to be amounts which do not lead to crosslinking or gelling of the copolymers, unless the intention is that they should be in the form of crosslinked microgel particles;

reaction products of alpha,beta-olefinically unsaturated carboxylic acids with glycidyl esters of an alpha-branched monocarboxylic acid having from 5 to 18 carbon atoms in the molecule. The reaction of the acrylic or methacrylic acid with the glycidyl ester of a carboxylic acid having a tertiary alpha carbon atom may take place before, during or after the polymerization reaction. As a component it is preferred to use the reaction product of acrylic and/or methacrylic acid with the glycidyl ester of Versatic® acid. This glycidyl ester is available commercially under the name Cardura® E10. For further details refer to Römpp Lexikon Lacke und Druckfarben, Georg Thieme Verlag, Stuttgart, N.Y., 1998, pages 605 and 606;

formaldehyde adducts of aminoalkyl esters of alpha,beta-olefinally unsaturated carboxylic acids and of alpha, beta-unsaturated carboxamides, such as N-methylolaminoethyl acrylate and methacrylate and N-methylolaminoethyl acrylamide and -meth-acrylamide; and also olefinically unsaturated monomers containing acryloyloxysilane groups and hydroxyl groups, preparable by reacting hydroxy-functional silanes with epichlorohydrin and then reacting the intermediate with an alpha, beta-olefinically unsaturated carboxylic acid, especially acrylic and methacrylic acid, or the hydroxyalkyl esters thereof.

Examples of suitable silanes of the general formula VI are known, for example, from German patent application DE 199 10 876 A1.

The modifier (B) is preferably selected from the group consisting of hydroxyl-containing compounds of the general formula VII:

R²—OH (VII)

in which the variable R² is as defined above. Particular preference is given to using aliphatic, especially primary, alcohols, such as described, for example, in the American patent U.S. Pat. No. 4,652,470 A1, column 9, line 59 to column 10, line 5. With very particular preference n-hexanol is used.

The modifier (C) is preferably selected from the group consisting of silanes of the general formula VIII:

in which the index p=1, 2 or 3, especially 1, and the variables R² and R³ are as defined above.

Examples of suitable silanes (C) are described in the

American patent U.S. Pat. No. 5,998,504 A, column 4, line 30 to column 5, line 20. With particular preference trimethylethoxysilane is used.

As nanoparticles for modification it is possible to select any conventional nanoparticles. They are preferably selected from the group consisting of metals, compounds of metals, and organic compounds.

The metals are preferably selected from main groups three to five, transition groups three to six and transition groups one and two of the periodic system of the elements, plus the lanthanoids, and preferably from the group consisting of boron, aluminum, gallium, silicon, germanium, tin, arsenic, antimony, silver, zinc, titanium, zirconium, hafnium, vanadium, niobium, tantalum, molybdenum, tungsten, and cerium. In particular, aluminum and silicon are used.

The compounds of the metals are preferably oxides, oxide hydrates, sulfates, hydroxides or phosphates, especially oxides, oxide hydrates, and hydroxides.

Examples of suitable organic compounds are lignins and starches.

The nanoparticles for modification preferably have a primary particle size <50 nm, more preferably from 5 to 50 nm, in particular from 10 to 30 nm.

The nanoparticles of the invention may per se be prepared by reacting the nanoparticles for modification, in the preparation process of the invention, in any order with the modifiers described above. Preferably, however, they are reacted in a first stage with at least one, especially one, modifier (A) and in a second stage with at least one, especially one, modifier (B), and in a third stage with at least one, especially one, modifier (C). Alternatively they are reacted in a second stage with one, especially one, modifier (C) and in a third stage with one, especially one, modifier (B). In a further alternative they are reacted in a second stage with at least one, especially one, of the modifiers (B) and (C).

In a further variant of the preparation process of the invention, at least one, especially one, modifier (A) of the general formula II and at least one, especially one, modifier (C) of the general formula VIII are hydrolyzed and condensed with one another in accordance with the sol-gel process, after which the resultant polycondensates are reacted with at least one, especially one, modifier (B) to give the nanoparticles of the invention (cf. Römpp Online, Georg Thieme Verlag, Stuttgart, 2002, "sol-gel process").

In the reaction of the silanes (A) and (C) with, or to give, the nanoparticles for modification, it is preferred to use conventional catalysts for hydrolysis, such as organic and inorganic acids.

The modifiers (A), (B), and (C) may per se be reacted in arbitrary proportions with, or to give, the nanoparticles for modification. Nevertheless it is advisable to use the modifiers (A), (B), and (C) in amounts such as to give the above-described weight ratios of the modifying groups (A), (B), and (C).

The nanoparticles of the invention may per se be put to any end uses, such as those described in the international patent application WO 99/52964 page 12, line 10 to page 14, line 4; in particular, however, the nanoparticles of the invention are suitable for preparing dispersions in aprotic, especially apolar aprotic, solvents and/or reactive diluents.

Aprotic solvents are organic solvents which contain no protolyzable hydrogen atoms, i.e., which are not proton donors. For further details, refer to Römpp Lexikon Lacke und Druckfarben, Georg Thieme Verlag, Stuttgart, New York 1998, page 41, "Aprotic solvents", or Römpp Online, Georg Thieme Verlag, Stuttgart, N.Y., 2002, "Aprotic solvents".

By reactive diluents are meant reactive diluting media or reactive solvents, and represents a simplified expression for the longer designation according to DIN 55945: 1996-09, which describes diluting agents which in the course of film formation undergo chemical reaction to become part of the binder. They are, in particular, olefinically unsaturated monomers containing at least one double bond, in particular at least two double bonds. For further details refer to Römpp Lexikon Lacke und Druckfarben, Georg Thieme Verlag, Stuttgart, N.Y., 1998, page 491, "Reactive diluents".

With particular preference the aprotic solvents and/or reactive diluents have with regard to the modifying groups (A) and (B) a Flory-Huggins parameter $\chi>0.5$ (cf. in this respect K. Kehr, Mittlere Feldtheorie von Polymerlösungen, Schmelzen und Mischungen [Mean field theory of polymer solutions, melts and mixtures]; random phase approximation, in Physik der Polymere, $22^{nd}$ IFF Holiday Course, Forschungszentrum Jülich GmbH, Jülich, 1991).

Based on their total amount and by weight, the dispersions of the invention surprisingly have a solids content >30%, preferably >40%, and in particular >50%, without any sedimentation or gelling. For example, the dispersions of the invention comprising nanoparticles of the invention based on silica have solids contents of between 25 and 70%, with the fraction of pure silica, which is given by the ignition residue, being situated preferably between 1 and 40% by weight, in particular between 20 and 30% by weight.

Even following the addition of polyisocyanates, such as, for example, a 90% dilution of hexamethylene diisocyanate in solvent naphtha/butyl acetate, the dispersions of the invention exhibit no tendency whatsoever to form gel.

Transfer of the nanoparticles of the invention into the aprotic, especially apolar aprotic, solvents or reactive diluents is accomplished by distillation. In order to optimize the process it is therefore possible to use certain entrainers, which form low-boiling azeotropes with the protic solvents used. The process according to the invention allows the preparation of dispersions of the invention having a residual protic solvent content of less 1% by weight (according to GC analysis).

The dispersions of the invention may comprise at least one additive. The additive is preferably selected from the group consisting of conventional polymeric and oligomeric binders, crosslinking agents, color and/or effect pigments, organic and inorganic, transparent or opaque fillers, other nanoparticles different than the nanoparticles of the invention, UV absorbers, light stablizers, free-radical scavengers, devolatilizers, slip additives, polymerization inhibitors, photoinitators, initiators of free-radical or cationic polymerization, defoamers, emulsifiers, wetting agents, dispersants, adhesion promoters, leveling agents, film formation auxiliaries, sag control agents (SCAs), rheological control additives (thickeners), flame retardants, siccatives, dryers, antiskinning agents, corrosion inhibitors, waxes, and flatting agents. Use is made in particular of coatings additives (cf. also the textbook by Johan Bieleman, "Lackadditive" [Additives for Coatings], Wiley-VCH, Weinheim, New York, 1998, or Römpp Online, Georg Thieme Verlag, Stuttgart, N.Y., 2002, "Additives").

The selection of the additive is guided in particular by the end use envisaged for the dispersion of the invention. It is important here that the additive must not detract from the stability of the dispersion of the invention.

The preparation of the dispersion of the invention necessitates no methodological peculiarities but instead takes place in accordance with the conventional methods for preparing dispersions, by mixing of the above-described constituents in suitable mixing equipment such as stirred tanks, dissolvers, including inline dissolvers, agitator mills or extruders.

The nanoparticles of the invention and the dispersions of the invention are extremely broad in their usefulness and in this respect they surpass the modified nanoparticles of the prior art. In particular they may be used to prepare coating materials, adhesives, sealants, compounds based on engineering plastics, and curable compositions.

In this context, the coating materials serve for producing coatings and paint systems, the adhesives for producing adhesive films, the sealants for producing seals, and the compounds based on engineering plastics and the curable compositions for producing moldings, especially optical moldings, self-supporting films, and rigid foams.

They are outstandingly suitable in particular for protecting surfaces of substrates of any kind from damage due to mechanical exposure, especially for protection against scratches, and/or for decoration of said substrates. These substrates are, in particular, motor vehicles or parts thereof, constructions, furniture, windows, and doors, small industrial parts, coils, containers, packaging, white goods, films, optical components, electrical components, mechanical components, and hollow glassware. Further examples of end uses and substrates are known from German patent application DE 198 16 136 A1, column 7, line 54 to column 8, line 58, or the international patent application WO 99/52964, page 12, line 10 to page 14, line 4.

The coating materials of the invention can surprisingly be formulated as two-component or multicomponent systems. The two-component and multicomponent systems of the invention, especially those based on polyisocyanates, have a particularly long pot life or working time. They can be cured thermally and with actinic radiation (dual cure).

With particular preference the coating materials of the invention are used for producing highly scratch-resistant clearcoats as part of the OEM finishing of automobiles with multicoat color and/or effect paint systems. As is known, these particularly high-grade multicoat paint systems are produced by what are termed wet-on-wet techniques, such as are known, for example, from German patent application DE 199 30 665 A1, page 15, line 15 to page 16, line 24.

To produce the coatings and paint systems of the invention, the coating materials of the invention are applied using suitable techniques which are conventional for the end use in question, such as spraying, knife coating, brushing, flow coating, dipping, impregnating, trickling or rolling, for example. The substrate to be coated may itself be at rest, with the application equipment or unit being moved. Alternatively the substrate to be coated, especially a coil, may be moved, with the application unit being at rest relative to the substrate or being moved appropriately.

To produce the moldings of the invention the dispersions of the invention are poured into appropriate hollow molds and cured therein, after which they are released from the hollow molds. The compounds of the invention based on engineering plastics are preferably extruded and then injection-molded in appropriate hollow molds.

To produce the films of the invention, the conventional techniques such as casting or film blowing are employed.

To produce the rigid foams of the invention, use is made of the methods which are conventional in the field of foamed plastics (cf. Römpp Online, Georg Thieme Verlag, Stuttgart, N.Y. 2002, "foamed plastics").

The thermal curing of the coating materials, adhesives, sealants, and curable compositions of the invention may take place after a certain rest time. This can have a duration of 30 seconds to 2 hours, preferably from 1 minute to 1 hour, and in particular from 1 to 45 minutes. The rest time serves, for example, for leveling and devolatilization of the coating films or for the evaporation of volatile constituents. The rest time may be shortened and/or assisted by the use of elevated temperatures, provided this does not entail any damage or alteration to the coating materials, adhesives, sealants, and curable compositions of the invention, such as premature complete crosslinking, for instance.

The thermal cure has no methodological peculiarities but instead takes place in accordance with the conventional methods such as heating in a forced air oven or irradiation using IR lamps. Thermal curing here may also take place in stages. Another preferred method of curing is that of curing with near infrared (NIR) radiation. Suitable techniques of this kind are described, for example, by Rodger Talbert in Industrial Paint & Powder, 04/01, pages 30 to 33, "Curing in Seconds with NIR", or in Galvanotechnik, volume 90 (11), pages 3098 to 3100, "Lackiertechnik, NIR-Trocknung im Sekundentakt von Flüssig-und Pulverlacken" [Coating technology, NIR drying in seconds for liquid and powder coatings].

The thermal curing takes place advantageously at a temperature from 50 to 200° C., with particular preference from 60 to 180° C., and in particular from 80 to 160° C. for a time of from 1 minute up to 2 hours, with particular preference to 2 minutes up to 1 hour, and in particular from 3 to 30 minutes.

Actinic radiation curing is preferably conducted using UV radiation and/or electron beams. It is preferred here to employ a dose of from 1000 to 3000, more preferably from 1100 to 2900, with particular preference from 1200 to 2800, with very particular preference from 1300 to 2700, and in particular from 1400 to 2600 mJ/cm². The radiative intensity is preferably from $1\times10^0$ to $3\times10^5$, preferably from $2\times10^0$ to $2\times10^5$, with particular preference from $3\times10^0$ to $1.5\times10^5$, and in particular from $5\times10^0$ to $1.2\times10^5$ W m$^{-2}$.

Where appropriate, curing may be supplemented by actinic radiation from other sources. In the case of electron beams it is preferred to operate under an inert gas atmosphere. This can be ensured, for example, by supplying carbon dioxide and/or nitrogen directly to the surface of the coating films. In the case of curing with UV radiation as well it is possible to operate under inert gas or in an oxygen-depleted atmosphere in order to prevent the formation of ozone.

For curing with actinic radiation use is made of the conventional radiation sources and optical auxiliary measures. Examples of suitable radiation sources are flash lamps from the company VISIT, high-pressure or low-pressure mercury vapor lamps, which where appropriate are doped with lead in order to open up a radiation window up to 405 nm, or electron beam sources. The equipment and conditions for these curing methods are described, for example, in R. Holmes, U.V. and E. B. Curing Formulations for Printing Inks, Coatings and Paints, SITA Technology, Academic Press, London, United Kingdom, 1984. Further examples of suitable methods and apparatus for curing with actinic radiation are described in German patent application DE 198 18 735 A1, column 10, lines 31 to 61, by R. Stephen Davidson in "Exploring the Science, Technology and Applications of U.V. and E. B. Curing", Sita Technology Ltd., London, 1999, or by Dipl.-Ing. Peter Klamann in "eltosch System-Kompetenz, UV-Technik, Leitfaden für Anwender" [eltosch systems expertise, UV technology, guiding principles for users], October 1998.

In the case of workpieces of complex shape, as are envisaged for automobile bodies, those regions not accessible to direct radiation (shadow regions), such as cavities, folds, and other structural undercuts, may be (partially) cured using pointwise, small-area or all-round emitters, in conjunction with an automatic movement means for the irradiation of cavities or edges.

Curing here may take place in stages, i.e., by multiple exposure to light or actinic radiation. It may also be done alternately, i.e., by curing alternately with UV radiation and electron beams.

Where thermal curing and actinic radiation curing are employed together, these methods may be used simultaneously or alternately. Where the two curing methods are used alternately, it is possible, for example, to commence with the thermal cure and to end with the actinic radiation cure. In other cases it may prove advantageous to commence with the actinic radiation cure and to end with it.

The coatings, paint systems, adhesive films, seals, moldings, self-supporting films, and rigid foams of the invention have outstanding performance properties. Particular emphasis should be placed on their high transparency and clarity and on their particularly high scratch resistance.

The coatings and paint systems of the invention have an outstanding profile of properties which is very well balanced in terms of mechanics, optics, corrosion resistance and adhesion. Thus the multicoat paint systems of the invention have the high optical quality and intercoat adhesion the market requires and do not give rise to any problems such as deficient condensation resistance, cracking (mud cracking) or leveling defects or surface structures in the clearcoats of the invention. In particular, the multicoat paint systems of the invention exhibit an outstanding metallic effect, outstanding D.O.I. (distinctiveness of the reflected image), and outstanding surface smoothness.

Accordingly, substrates coated, for example, with at least one coating, paint system or self-supporting film of the invention, bonded with an adhesive film of the invention and/or sealed with a seal of the invention combine a particularly advantageous profile of performance properties with a particularly long service life, so making them particularly valuable economically, esthetically, and technically.

EXAMPLES

Preparation Example 1

Preparation of the Modifier (A1)

80.2 g of a partially blocked and about 40% silanized isophorone diisocyanate trimer as per preparation example 1 of European patent application EP 1 193 278 A1 were combined with 13.97 g of 3,5-dimethylpyrazole in a three-neck flask with reflux condenser and thermometer and were heated to 50° C. with stirring. The progress of the reaction was monitored by means of IR spectroscopy. After 13 hours the blocking reaction was completely over: free isocyanate groups could no longer be detected by IR spectroscopy.

Preparation Example 2

Preparation of the Modifier (A2)

40.6 g of a partially blocked and about 40% silanized isophorone diisocyanate trimer as per preparation example 1 of European patent application EP 1 193 278 A1 were combined with 9 g of 2-hydroxyethyl methacrylate in a three-neck flask with reflux condenser and thermometer and were heated to 90° C. with stirring. The progress of the reaction was monitored by means of IR spectroscopy. After 36 hours the blocking reaction was completely over: free isocyanate groups could no longer be detected by IR spectroscopy.

Preparation Example 3

Preparation of the Modifier (A3)

50.2 g of a partially blocked and about 40%-silanized isophorone diisocyanate trimer as per preparation example 1 of European patent application EP 1 193 278 were combined with 9.8 g of 2-hydroxyethyl acrylate in a three-neck flask with reflux condenser and thermometer and were heated to 90° C. with stirring. The progress of the reaction was monitored by means of IR spectroscopy. After 30 hours the blocking reaction was completely over: free isocyanate groups could no longer be detected by IR spectroscopy.

Example 1

The Preparation of Modified Nanoparticles and Their Dispersion in an Aprotic Solvent 11.1 parts by weight of the modifier A1 from preparation example 1 were heated to 70° C. and slowly admixed with 19.9 parts by weight of a colloidal solution of $SiO_2$ in isopropanol (IPA-ST-S, available from Nissan Chemical) and with one part by weight of 0.1 N acetic acid. The mixture obtained in this way was stirred at 70° C. for another 2 hours and then slowly admixed by dropwise addition over a period of at least 30 minutes with 0.7 part by weight of trimethylethoxysilane. Thereafter 10.3 parts by weight of solvent naphtha and 1.6 parts by weight of hexanol were added and the solution obtained was stirred at 70° C. for 2 hours more. In order to separate off low-boiling constituents, the cooled reaction mixture was separated from the low-boiling constituents on a rotary evaporator with a bath temperature of not more than 55° C. under reduced pressure.

The resultant dispersion of the modified nanoparticles had protic solvent (isopropanol, hexanol) content of less than 1% by weight. The solids content was 53%. The blocked isocyanate group content was 2.26% by weight. The dispersion was stable at 40° C. for a period of at least 30 days without any rise in viscosity being observed. The reactivity of the dispersion toward free isocyanates was extremely low. A mixture of 9 parts by weight of Basonat® HI 190, a polyisocyanate from BASF Aktiengesellschaft, 0.5 part by weight of butyl acetate, 0.5 part by weight of solvent naphtha and 10 parts by weight of the inventive dispersion of modified nanoparticles was stable at room temperature even after 6 days and showed no gelling whatsoever.

Examples 2 and 2a

The Preparation of Modified Nanoparticles and Their Dispersion in Aprotic Solvents The procedure of example 1 was repeated except that the colloidal solution of $SiO_2$ IPA-ST-S was replaced by the colloidal solution of $SiO_2$ IPA-ST (example 2) and by the colloidal solution of $SiO_2$ MA-ST (example 2a). The resultant dispersions of modified nanoparticles of examples 2 and 2a showed the same outstanding properties as described for example 1.

Example 3

The Preparation of Modified Nanoparticles and Their Dispersion in Aprotic Solvents The procedure of example 1 was repeated except that the solvent naphtha solvent used in example 1 was replaced by diisobutyl ketone. The resulting dispersion of modified nanoparticles had the same outstanding properties as described for example 1.

Example 4

The Preparation of Modified Nanoparticles and Their Dispersion in a Reactive Diluent 5.1 parts by weight of the modifier A2 from preparation example 2 were heated to 70° C. and slowly admixed with 9.1 parts by weight of a colloidal solution of $SiO_2$ in isopropanol (IPA-ST, available from Nissan Chemical) and with 0.5 part by weight of 0.1 N acetic acid. The mixture obtained in this way was stirred at 70° C. for another 3 hours and then slowly admixed by dropwise addition over a period of at least 30 minutes with 0.3 part by weight of trimethylethoxysilane. Thereafter 4.7 parts by weight of n-butylmethacrylate (reactive diluent) and 0.7 part by weight of hexanol were added and the solution obtained was stirred at 70° C. for 3 hours more. In order to separate off low-boiling constituents, the cooled reaction mixture was separated from the low-boiling constituents on a rotary evaporator with a bath temperature of not more than 55° C. under reduced pressure.

The resultant dispersion of the modified nanoparticles had a protic solvent (isopropanol, hexanol) content of less than 1% by weight. The solids content was 57%. The blocked isocyanate group content was 2.14% by weight. The dispersion obtained was stable at room temperature for a period of at least 8 days without any rise in viscosity being observed.

The reactivity of the dispersion obtained toward free isocyanates was extremely low. A mixture of 9 parts by weight of Basonat® HI 190 from BASF Aktiengesellschaft, 0.5 part by weight of butyl acetate, 0.5 part by weight of solvent naphtha and 10 parts by weight of the inventive dispersion of nanoparticles was stable at room temperature even after 6 days and showed no gelling whatsoever.

The modified nanoparticles were extremely suitable for preparing gels based on (meth)acrylates and also as a starting point for the preparation of highly branched polymers which despite a high molecular weight had a comparatively low viscosity.

Example 5

The Preparation of Modified Nanoparticles and Their Dispersion in Aprotic Solvents 11.1 parts by weight of the modifier A3 from preparation example 3 were heated to 70° C. and slowly admixed with 19.9 parts by weight of a colloidal solution of $SiO_2$ in isopropanol (IPA-ST, available from Nissan Chemical) and with 1 part by weight of 0.1 N acetic acid. The mixture obtained in this way was stirred at 70° C. for another 3 hours and then slowly admixed by dropwise addition over a period of at least 30 minutes with 0.7 part by weight of trimethylethoxysilane. Thereafter 10.3 parts by weight of solvent naphtha and 1.6 parts by weight of hexanol were added and the solution obtained was stirred at 70° C. for 3 hours more. In order-to separate off low-boiling constituents, the cooled reaction mixture was separated from the low-boiling constituents on a rotary evaporator with a bath temperature of not more than 55° C. under reduced pressure.

The resultant dispersion of the modified nanoparticles had a protic solvent (isopropanol, hexanol) content of less than 1% by weight. The solids content was 50.4%. The blocked isocyanate group content was 2.39% by weight. The dispersion obtained was stable at room temperature for a period of at least 8 days without any rise in viscosity being observed.

The reactivity of the dispersion obtained toward free isocyanates was extremely low. A mixture of 9 parts by weight of Basonat® HI 190 from BASF Aktiengesellschaft, 0.5 part by weight of butyl acetate, 0.5 part by weight of solvent naphtha and 10 parts by weight of the inventive dispersion of nanoparticles was stable at room temperature even after 6 days and showed no gelling whatsoever.

The dispersion was outstandingly suitable for preparing dual-cure clearcoat materials (curable thermally and with actinic radiation).

Example 6

The Preparation of Modified Nanoparticles and Their Dispersion in Aprotic Solvents 11.1 parts by weight of the modifier from preparation example 3 were heated to 70° C. and slowly admixed with 19.9 parts by weight of a colloidal solution of $SiO_2$ in isopropanol (IPA-ST, available from Nissan Chemical) and with 1 part by weight of 0.1 N acetic acid. The mixture obtained in this way was stirred at 70° C. for another 3 hours and then slowly admixed by dropwise addition over a period of at least 30 minutes with 0.7 part by weight of trimethylethoxysilane. Thereafter 10.3 parts by weight of Sartomer® 399 (reactive diluent, available from Cray Valley) and 1.6 parts by weight of hexanol were added and the solution obtained was stirred at 70° C. for 3 hours more. In order to separate off low-boiling constituents, the cooled reaction mixture was separated from the low-boiling constituents on a rotary evaporator with a bath temperature of not more than 60° C. under reduced pressure.

The resulting dispersion of the modified nanoparticles had an $SiO_2$ content of 22.4% by weight (determined gravimetrically from the residue on ignition at 800° C./30 minutes).

The dispersion was outstandingly suitable for preparing particularly high-solids UV-curable coating materials (100% systems).

Example 7

The Preparation of Modified Nanoparticles and Their Dispersion in Aprotic Solvents 11.1 parts by weight of the modifier (A1) from preparation example 1 were heated to. 70° C. and slowly admixed with 19.9 g of isopropanol and with one part by weight of 0.1 N acetic acid. The solution obtained was stirred at 70° C. for another 3 hours and then slowly admixed by dropwise addition over a period of at least 30 minutes with 0.7 part by weight of trimethylethoxysilane. The solution obtained was stirred at 70° C. for 3 hours more. Thereafter 10.3 parts by weight of solvent naphtha and 1.6 parts by weight of hexanol were added. In order to separate off low-boiling constituents, the cooled reaction mixture was separated from the low-boiling constituents on a rotary evaporator with a bath temperature of not more than 55° C. under reduced pressure.

The resultant dispersion of the nanoparticles had a protic solvent (isopropanol, hexanol) content of less than 1% by weight. The solids content was 38.1 percent. The blocked isocyanate group content was 3.21% by weight.

The reactivity of the dispersion obtained toward free isocyanates was extremely low. A mixture of 9 parts by weight of Basonat® HI 190 from BASF Aktiengesellschaft, 0.5 part by weight of butyl acetate, 0.5 part by weight of solvent naphtha and 10 parts by weight of the dispersion of nanoparticles was stable at room temperature even after 6 days and showed no gelling whatsoever.

Examples 8 and 9

The Preparation of Modified Nanoparticles and Their Dispersion in Aprotic Solvents Example 7 was repeated but using different amounts of solvent naphtha: in example 8 5.3 parts by weight of solvent naphtha and in example 9 3.7 parts by weight of solvent naphtha were used instead of 10.3 parts by weight.

This gave the markedly increased solids fractions depicted in table 1. Disregarding the different solids contents and, as a result thereof, the different parameters (for example, the blocked isocyanate group content), the same outstanding material properties are produced in terms of the performance aspects.

TABLE 1

| Example | Solids content (% by weight) | Blocked isocyanate group content (% by weight) |
|---|---|---|
| 8 | 52.2 | 4.19 |
| 9 | 62.2 | 4.68 |

What is claimed is:

1. Surface-modified nanoparticles whose surface is covered completely or near-completely with
   (A) modifying groups which are attached covalently to the surface via at least one linking functional group (a) and contain at least one inert spacer group (b) and contain at least one reactive functional group (c) which is connected via the group (b) to the group (a) and is inert toward the reactive functional groups of the surface to be modified,
   (B) modifying groups which are attached covalently to the surface via at least one linking functional group (a) and contain at least one inert group (d) attached to the surface via group (a) having a smaller hydrodynamic volume $V_H$ than the inert spacer group (Ab), and
   (C) modifying groups which are attached covalently to the surface via at least one linking functional group (a) which contains at least one silicon atom, contain at least one inert group (e) attached to the surface via group (a), and have a smaller hydrodynamic volume $V_H$ than the modifying group (A).

2. Surface-modified nanoparticles as claimed in claim 1, wherein the hydrodynamic volume $V_H$ can be determined by means of photon correlation spectroscopy or estimated using the equation $$V_H = (r_{cont}/2)^3$$

in which $r_{cont}$ is the effective contour length of a molecule.

3. Surface-modified nanoparticles as claimed in claim 1, wherein the reactive functional groups of the surface to be modified are hydroxyl groups.

4. Surface-modified nanoparticles as claimed in claim 1, wherein the linking functional group (Aa) contains at least one silicon atom.

5. Surface-modified nanoparticles as claimed in claim 1, wherein the inert spacer group (Ab) is an at least divalent organic radical R.

6. Surface-modified nanoparticles as claimed in claim 1, wherein the reactive functional group (Ac) is activable thermally, and/or with actinic radiation, or both thermally and with actinic radiation.

7. Surface-modified nanoparticles as claimed in claim 6, wherein the reactive functional group (Ac) can be activated with actinic radiation and contains at least one carbon-carbon multiple bond.

8. Surface-modified nanoparticles as claimed in claim 6, wherein the reactive functional group (Ac) is thermally activable and is a blocked isocyanate group.

9. Surface-modified nanoparticles as claimed in claim 1, wherein the linking functional group (Ba) is selected from the group consisting of ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphorphide, thiophosphorphide, phosphonphide, thiophosphonamide, sulfonamide, imide, hydrazide, urethane, urea, thiourea, carbonyl, thiocarbonyl, sulfone and sulfoxide groups.

10. Surface-modified nanoparticles as claimed in claim 1, wherein the inert group (Bd) and the inert group (Ce) are monovalent organic radicals $R^2$.

11. Surface-modified nanoparticles as claimed in claim 10, wherein the monovalent organic radicals $R^2$ are selected from the group consisting of aliphatic, cycloaliphatic, aromatic, aliphatic-cycloaliphatic, aliphatic-aromatic, cycloaliphatic-aromatic, and aliphatic-cycloaliphatic-aromatic radicals.

12. Surface-modified nanoparticles as claimed in claim 11, wherein the inert groups (Ab), (Bd), and (Ce) contain at least one at least divalent functional group, and/or at least one substituent, or both.

13. Surface-modified nanoparticles as claimed in claim 1, prepared by reacting the reactive functional groups of the surface of nanoparticles for modification with (A) at least one modifier containing at least one reactive functional group (a) which is reactive toward the reactive functional groups of the surface to be modified, at least one inert spacer group (b) and at least one reactive functional group (c) which is connected via the group (b) to the group (a) and is inert toward the reactive functional groups of the surface to be modified, (B) at least one modifier containing at least one reactive functional group (a) which is reactive toward the reactive functional groups of the surface to be modified, and at least one inert group (d) having a smaller hydrodynamic volume $V_H$ than the inert spacer group (Ab), and also (C) at least one modifier having a smaller hydrodynamic volume $V_H$ than the modifier (A), containing at least one reactive functional group (a) which contains at least one silicon atom and is reactive toward the reactive functional groups of the surface to be modified, and at least one inert group (e).

14. Surface-modified nanoparticles as claimed in claim 13, wherein the modifier (A) is selected from the group consisting of silanes of the general formula II:

$$[(R^2)_o(R^3)_{3-o}Si]_m R(Ac)_n \qquad (II)$$

in which the indices and the variables have the following definitions:
m and n are integers from 1 to 6;
o is 0, 1 or 2;
Ac is a group activable thermally and/or with actinic radiation, as defined above;
R is an at least divalent organic radical, as defined above;
$R^2$ is a monovalent organic radical, as defined above; and
$R^3$ is a hydrolyzable atom or group.

15. Surface-modified nanoparticles as claimed in claim 14, wherein the hydrolyzable atom $R^3$ is selected from the group consisting of hydrogen atoms, fluorine atoms, chlorine atoms, and bromine atoms and the hydrolyzable group $R^3$ is selected from the group consisting of hydroxyl groups and monovalent organic radicals $R^4$.

16. Surface-modified nanoparticles as claimed in claim 15, wherein the monovalent organic radical $R^4$ is selected from the group consisting of groups of the general formula III:

$$-Y-R^2 \qquad (III)$$

in which the variable Y stands for an oxygen atom a carbonyl group, carbonyloxy group, oxycarbonyl group, amino group -NH- or secondary amino group $-NR^2-$.

17. Surface-modified nanoparticles as claimed in claim 14, wherein the silanes (A) of the general formula II are obtained by (1) reacting polyisocyanates with blocking agents and with silanes of the general formula IV:

$$[(R^2)_o(R^3)_{3-o}Si]_m RZ \qquad (IV)$$

in which the variable Z stands for an isocyanate-reactive functional group; or (2) reacting compounds of the general formula V:

$$(Ac)_n R-Z \qquad (V)$$

with silanes of the general formula VI:

$$[(R^2)_o(R^3)_{3-o}Si]_m R-NCO \qquad (VI).$$

18. Surface-modified nanoparticles as claimed in claim 13, wherein the modifier (B) is selected from the group consisting of hydroxyl-containing compounds of the general formula VII:

$$R^2-OH \qquad (VII).$$

19. Surface-modified nanoparticles as claimed in claim 18, wherein the hydroxyl-containing compounds of the general formula VII are primary aliphatic alcohols.

20. Surface-modified nanoparticles as claimed in claim 13, wherein the modifier (C) is selected from the group consisting of silanes of the general formula VIII:

$$(R^2)_{4-p}Si(R^3)_p \qquad (VIII).$$

21. Surface-modified nanoparticles as claimed in claim 1, wherein the nanoparticles for modification are selected from the group consisting of metals, compounds of metals, and organic compounds.

22. Surface-modified nanoparticles as claimed in claim 21, wherein the nanoparticles for modification are metals or compounds of metals, selected from main groups three to five transition groups three to six transition groups one to two, and the lanthanoids.

23. Surface-modified nanoparticles as claimed in claim 21 wherein the nanoparticles for modification are compounds the metals selected from the group consisting of oxides, oxide hydrates, sulfates, hydroxides, and phosphates.

24. A composition comprising the use of the surface-modified nanoparticles as claimed in claim 1, wherein the composition is a member selected from the group consisting of coating materials, adhesives, sealants, compounds based on engineering plastics, and curable compositions.

25. A process for preparing surface-modified nanoparticles as claimed in claim 1, comprising reacting the nanoparticles for modification in a first stage with at least one modifier (A) and also in a second stage with at least one modifier (B) and in a third stage with at least one modifier (C) or in the second stage with at least one modifier (C) and in the third stage with at least one modifier (B) or in the second stage with at least one modifier (B) and at least one modifier (C).

26. The process as claimed in claim 25, wherein the modifiers (A), (B), and (C) are used in an amount which is sufficient for the complete or near-complete coverage of the surface of the nanoparticles for modification.

27. A process for producing modified nanoparticles as claimed in claim 14, comprising jointly hydrolyzing and condensing at least one modifier (A) of the general formula II and at least one modifier (C) of the general formula VIII and then reacting the resultant polycondensates with at least one modifier (B).

* * * * *